(12) United States Patent
Xia et al.

(10) Patent No.: US 12,541,232 B2
(45) Date of Patent: Feb. 3, 2026

(54) MOBILE COMMUNICATION DEVICE

(71) Applicant: Intel Corporation, Santa Clara, CA (US)

(72) Inventors: Qing De Xia, Shanghai (CN); Klaus Heinz Goebel, Taipei (TW); Jun Liu, Shanghai (CN); Matan Levy, Zur Moshe (IL); Yan Lu, Shanghai (CN); Joy Poddar, Bangalore (IN)

(73) Assignee: INTEL CORPORATION, Santa Clara, CA (US)

( * ) Notice: Subject to any disclaimer, the term of this patent is extended or adjusted under 35 U.S.C. 154(b) by 812 days.

(21) Appl. No.: 17/680,392

(22) Filed: Feb. 25, 2022

(65) Prior Publication Data

US 2023/0168722 A1 Jun. 1, 2023

(30) Foreign Application Priority Data

Nov. 26, 2021 (WO) ................ PCT/CN2021/133675

(51) Int. Cl.
| | |
|---|---|
| *G06F 1/16* | (2006.01) |
| *H01Q 1/22* | (2006.01) |
| *H01Q 3/06* | (2006.01) |
| *H01Q 9/04* | (2006.01) |

(52) U.S. Cl.
CPC .......... *G06F 1/1698* (2013.01); *G06F 1/1677* (2013.01); *H01Q 1/2266* (2013.01); *H01Q 3/06* (2013.01); *H01Q 9/0442* (2013.01)

(58) Field of Classification Search
CPC ... G06F 1/1698; G06F 1/1677; H01Q 1/2266; H01Q 3/06; H01Q 9/0442

USPC ...... 455/557, 77, 550.1, 575.3, 575.7, 575.8
See application file for complete search history.

(56) References Cited

U.S. PATENT DOCUMENTS

| | | | | |
|---|---|---|---|---|
| 8,204,446 | B2 * | 6/2012 | Scheer et al. .......... | H01Q 1/242 455/193.1 |
| 8,594,584 | B2 * | 11/2013 | Greene et al. ........... | H04B 1/18 375/135 |
| 8,712,340 | B2 * | 4/2014 | Hoirup et al. ....... | H04B 17/318 455/67.11 |
| 9,203,137 | B1 * | 12/2015 | Guterman et al. ..... | H01Q 1/243 |
| 9,680,202 | B2 * | 6/2017 | Irci et al. ............... | H01Q 1/243 |
| 11,115,511 | B1 * | 9/2021 | Ghaemi et al. ...... | H04B 7/0602 |

(Continued)

FOREIGN PATENT DOCUMENTS

CN 108345356 A * 7/2018 ......... E05D 11/0081

*Primary Examiner* — Rafael Pérez-Gutiérrez
(74) *Attorney, Agent, or Firm* — VIERING, JENTSCHURA & PARTNER mbB

(57) ABSTRACT

A mobile communication device having a first component and a second component is provided. The first component and the second component are configured movable relative to each other within a predefined position range. The predefined position range includes a plurality of positions of the first component relative to the second component. The mobile communication device further includes a position determination unit configured to determine a position of the first component relative to the second component in the predefined position range. At least one of the first component and the second component includes an antenna configured for wireless communication. The mobile communication device further includes a controller configured to drive the antenna based on the determined position of the first component relative to the second component.

24 Claims, 7 Drawing Sheets

(56) References Cited

U.S. PATENT DOCUMENTS

| | | | | |
|---|---|---|---|---|
| 11,283,908 | B1* | 3/2022 | Zhao et al. | H01Q 1/243 |
| 2012/0214421 | A1* | 8/2012 | Hoirup et al. | H04B 17/318 |
| | | | | 455/67.11 |
| 2012/0295554 | A1* | 11/2012 | Greene et al. | H04B 1/48 |
| | | | | 343/745 |
| 2012/0295555 | A1* | 11/2012 | Greene et al. | H01Q 5/314 |
| | | | | 343/745 |
| 2014/0361932 | A1* | 12/2014 | Irci | H01Q 1/2266 |
| | | | | 343/702 |
| 2022/0255239 | A1* | 8/2022 | Islam et al. | H01Q 1/243 |
| 2024/0094894 | A1* | 3/2024 | Dou et al. | G06F 1/1643 |
| 2024/0419321 | A1* | 12/2024 | Dou et al. | G04G 21/08 |

\* cited by examiner

Prior Art

MOBILE COMMUNICATION DEVICE

CROSS-REFERENCE

This non-provisional application claims priority to application PCT/CN2021/133675, filed on Nov. 26, 2021, the entirety of which is fully incorporated herein by reference.

TECHNICAL FIELD

This disclosure generally relates to portable communication devices having a movable display.

BACKGROUND

Recently, portable personal computer devices, such as Ultrabook, 2-in-1s and tablets, integrate a 4G ($4^{th}$ generation) or 5G ($5^{th}$ generation) wireless wide area network (WWAN) data-card for always-connected broadband Internet access.

MIMO (Multiple Input Multiple Output) techniques with multiple antennas support the increased data throughput, and improve radio frequency signal quality and strength. A WWAN 5G modem may have a plurality of antennas, e.g. at least four antennas with one or more of them for transition to give Gbps (Gigabit per second)-level uplink throughput. Some 5G modem designs select the lowest loss path for transmission by using BAS (Best Antenna Selection) feature. BAS requires that all the antennas are full bandwidth capable, and any one or two of them could be swapped for uplink transmission.

With ever shrinking of form-factor sizes for ultra-slim, ultra-small device design, it is becoming ever challenging with increased constrains and fewer choices to find suitable locations on the device chassis to place multiple antennas. At the same time, radio frequency performance must be ensured. The choice may be so few that the antenna performance suffers without proper antenna mitigation solution. Two sub-optimal antenna placements of the related art are illustrated in FIG. 1A, B and FIG. 1C, D.

In a first comparative example illustrated in FIG. 1A and FIG. 1B, two antennas 105 are located on the base of a mobile communication device while the other two antennas 105 are on the display lid of the mobile communication device, proximate to each other. The rotation of the display lid (transition from FIG. 1A to FIG. 1B) changes the relative position, and hence the near field environment and coupling of both antennas 105. This results in de-tuning of the antennas 105 and degradation of antenna gain in the WWAN data-card 106.

In a second comparative example illustrated in FIG. 1C and FIG. 1D, two antennas 105 of a mobile communication device are separately placed at the base with enough distance from each other, but a metallic side/frame 112 is used on the display lid. When the display lid is rotated (transition from FIG. 1C to FIG. 1D), the metallic or dielectric side/frame 112 position to the antennas 105 is changed, which also causes antenna de-tuning in the WWAN data-card 106 and thus deteriorates the antenna performance.

For 4G/5G data-card 106 which supports a wide frequency range from 600 MHz to 6 GHZ, a distance of 8 mm to 80 mm between the antennas 105 would have caused impact on antenna performance. With slim and small form-factor design constrains, such performance impact is not always easily avoided. It is thus crucial to address the antenna de-tuning caused performance-lose which are related to the antenna placement under chassis constraints.

In the related art, two types of antenna tuning approaches are known among smartphone and cellular modem design to address antenna performance, i.e. Open Loop Tuning (OLT) and Close Loop Tuning (CLT).

A close loop tuning may address the performance deterioration. However, close loop tuning algorithm can demand high memory footprint in the modem. Further, the complexity needs significant effort to design, tune and stabilize CLT. Thus, 4G/5G data card designs do not commercially support CLT, but use OLT. However, OLT cannot address the performance degradation caused by the cases like display lid rotation or display lid angle change. Thus, antenna designers seek for an optimal antenna placement, but at the cost such as enlarging the form-factor size thus harming the market competitiveness, or at the cost of other considerations, which might be, but not necessarily limited to, degraded thermal dissipation ability, acoustic performance, or a different material types to be chosen, etc.; or to accept a sub-optimal antenna placement, with the cost of performance degradation rotation and angle change.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects of the invention are described with reference to the following drawings, in which.

DESCRIPTION

Figure 1A:
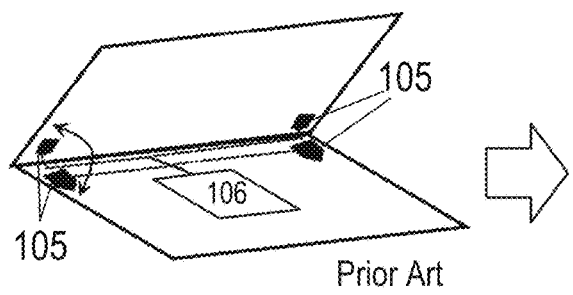
FIG. 1A and FIG. 1B illustrate schematic diagrams of a first comparative example of a mobile communication device.
Figure 1B:
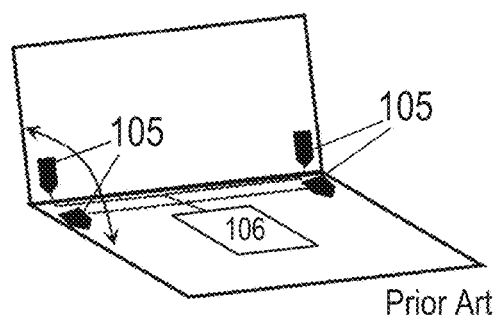
Figure 1C:
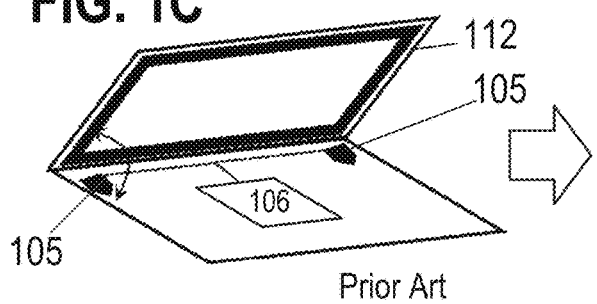
FIG. 1C and FIG. 1D illustrate schematic diagrams of a second comparative example of a mobile communication device.
Figure 1D:
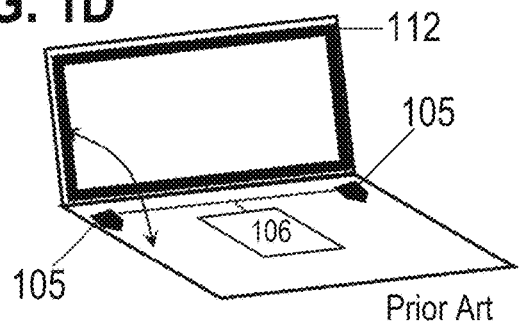

The following detailed description refers to the accompanying drawings that show, by way of illustration, specific details and aspects in which the disclosure may be practiced. One or more aspects are described in sufficient detail to enable those skilled in the art to practice the disclosure. Other aspects may be utilized and structural, logical, and electrical changes may be made without departing from the scope of the disclosure. The various aspects described herein are not necessarily mutually exclusive, as some aspects can be combined with one or more other aspects to form new aspects. Various aspects are described in connection with methods and various aspects are described in connection with devices. However, it may be understood that aspects described in connection with methods may similarly apply to the devices, and vice versa. Throughout the drawings, it should be noted that like reference numbers are used to depict the same or similar elements, features, and structures.

The mobile communication device disclosed here can work with open-loop antenna tuning and open-loop BAS.

The mobile communication device using an open loop antenna tuning can compensate the antenna performance loss caused by 'non-optimal' antenna placements, in particular when the performance degradation is caused by a rotation of the display panel of the mobile communication device.

Open loop antenna tuning may include using one or more preselected angular anchor points of the antenna arrangement for manual tuning. Open loop antenna tuning may further include an interpolation for other angle points.

As a result, a mobile communication device can obtain performance which is comparative to more complex close-loop-tuning algorithm which typically is unavailable on a WWAN data-card.

This way, antenna designers are more flexible and have more freedom to choose antenna-placement on a slim and small, size-constrained form-factor design, in particular in case of an increased number of antennas on the chassis of a mobile communication device. Thus, the communication device avoids unnecessarily enlarged form-factor size definition, and provides cost-saving and gives product competitiveness.

While in the following a rotation of the display panel housing one or more antennas coupled to a WWAN data-card relative to a chassis of the mobile communication device is described to illustrate the working principle, the method may also be applicable to movable display panels or other movable parts or components of the mobile communication device that is housing one or more antennas of the mobile communication device, e.g. a keyboard.

Alternative, or in addition to a rotation, the display panel can slide or bend relative to a chassis of the mobile communication device, as an example.

One or more predefined positions are defined within a movement range. In the predefined positions, In-Lab antenna-tuning may be performed, and a set of optimal antenna tuning parameters may be determined, respectively. A set of optimal antenna tuning parameters may be determined by aperture tuning and/or impedance tuning.

In other words, each of the predefined positions within the movement range includes optimal antenna tuning parameters. The antenna tuning parameters may be programmed into a WWAN data-card or module of the mobile communication device. As an example, the programming may be performed at the data card production-line stage and/or at the end-user run stage. While in operation, a controller for operating the mobile communication device determines a position of one or more components of the mobile communication device within the movement range relative to the predefined position. The controller determines antenna parameters associated to one or more predefined position next to the actual current position of the one or more movable component of the mobile communication device within the movement range, e.g. interpolates or selects antenna parameters associated to the predefined positions and stored in a memory. The controller uses the determined antenna tuning parameters to drive the antennas of the mobile communication device in the current position of the one or more movable component of the mobile communication device.

Predefined positions may also be denoted as preselected points, or predefined anchor points. The predefined position range includes a plurality of predefined positions of a first component, e.g. a display lid, and a second component, e.g. a chassis housing one or more antenna(s), that may be positioned relative to each other by a movement, e.g. by a rotation.

Figure 2:
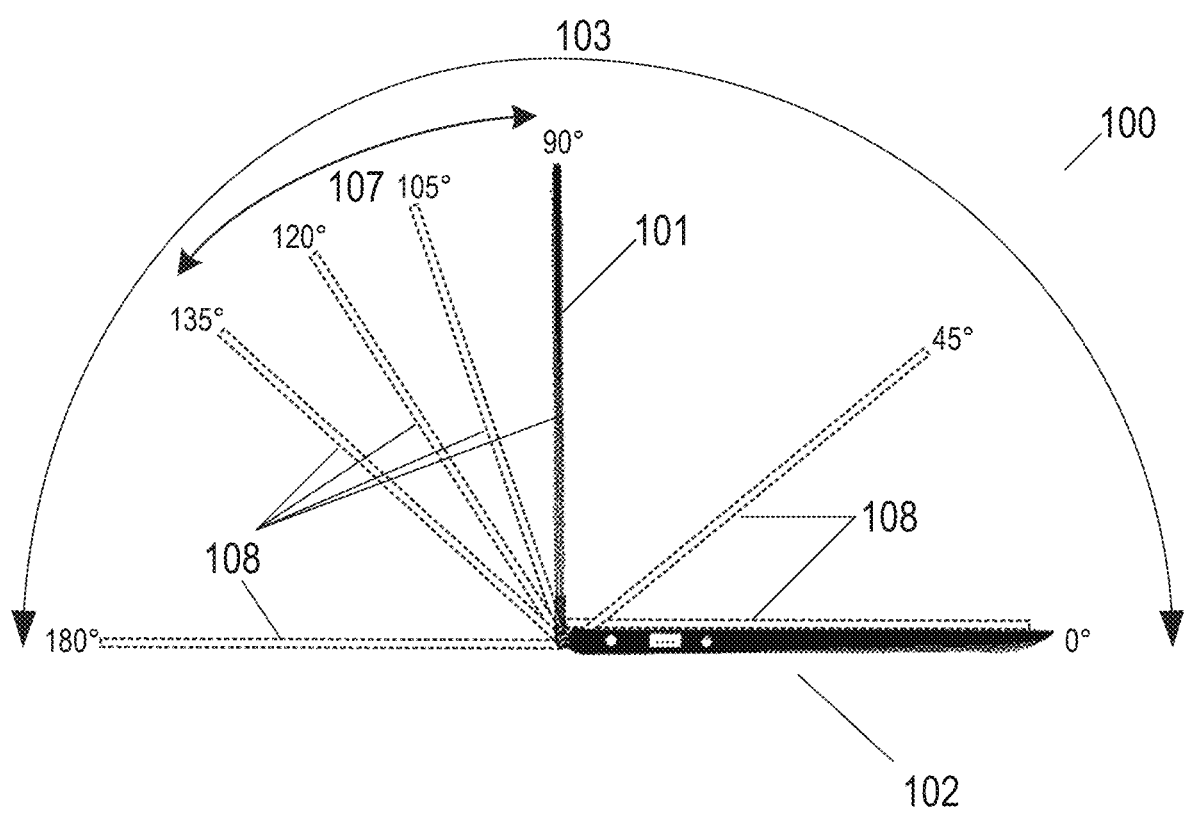
FIG. 2 illustrates a schematic diagram of a mobile communication device.

FIG. 2 illustrates a schematic diagram of a mobile communication device 100, e.g. during an in-lab antenna tuning based on predefined positions 108 (angular anchor points 108) of the display panel 101 position range 103. The display panel 101 (also denoted as first component) may be a liquid crystal display lid that is rotatable attached to a chassis 102 (also denoted as second component) of the mobile communication device 100 that may be a laptop, as an example. The display panel 101 may be configured rotatable around one or more axis of rotation.

In the example illustrated in FIG. 2, the display panel 101 may rotate in a movement range 103 between 0° and 180° along an axis of rotation parallel to a long side of the chassis 102 of the mobile communication device 100.

In this example, the predefined positions 108 may be seven angular anchor points. As an example, the predefined anchor points 108 may be equally spaced apart, e.g. having a spacing of 15°. Thus, the predefined angular anchor points may be: 0°, 45°, 90°, 105°, 120°, 135°, and 180°. However, this is only an illustrative example, and other angular spacing, unequal angular spacing and/or equal radian spacing, e.g. regarding the cosine of the angular positions, may be predefined.

In general, the mobile communication device 100 may be configured that the movement range 103 includes a sub-range 107 that is more frequented while using the mobile communications device 100. As an example, in the case of a laptop shaped mobile communication device 100 illustrated in FIG. 2, the display panel may be frequently positioned in an angular zone, e.g. the sub-range 107 of the movement range 103, between 90° to 135° relative to the chassis 102 of the mobile communication device 100. The chassis 102 may include one or more antennas as illustrated in FIG. 1A to FIG. 1D The sub-range 107 may have a first number density (per movement unit, e.g. per angle) of predefined positions 108 and the movement range other than the sub-range 103 of the movement range may have a second number density of predefined positions that is lower than the first number density. In other words, in the illustrated example, the sub-range 103 includes more predefined angular anchor points 108 than the remaining angular range of the movement range. This way, the mobile communication device 100 may provide improved performance in real use cases.

In the predefined positions 108, In-Lab antenna-tuning may provide a set of optimal antenna tuning parameters respectively that may be stored in a memory. Thus, a memory may provide optimal antenna tuning parameters associated to each of the predefined positions 108 with in the movement range 103.

During end-user run time, the rotation angle of the display panel 101 relative to the chassis 102 may be determined, e.g. measured via a mechanical sensor or one or more acceleration sensor(s), and transferred, e.g. reported, to the WWAN data-card firmware or its host-side driver software.

Angle measurement using an angle-sensor may determine the relative position of the display panel 101 within the movement range 103. A result of the angular measurement may be input 302 for the antenna tuning parameters selection or interpolation, as shown in FIG. 3.

Figure 3:
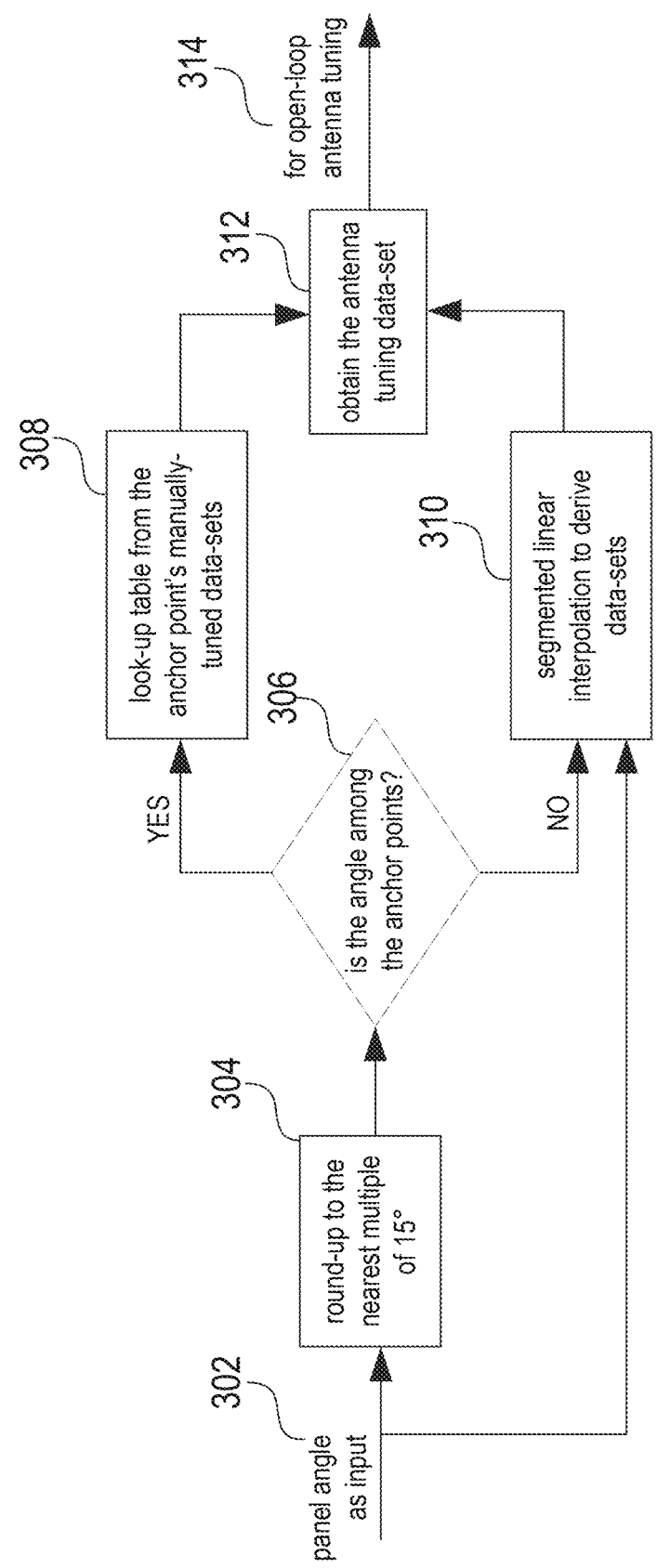
FIG. 3 illustrates a flow diagram of a method to operate a mobile communication device.

FIG. 3 illustrates a flow diagram of a method to operate a mobile communication device, e.g. a run-time determination of antenna tuning parameters. The method may determine one or more of the plurality of predefined positions based on the measured position of the display lid relative to the chassis of the mobile communication device. The determined predefined position may be a position closest to the measure position of the display lid. Illustratively, the measured angular position may be rounded to a predefined integral boundary 304. In the embodiment illustrated in FIG. 2, the measured angular position is rounded to a multiple of a 15° value. For instance, a measured angular position 78.5° is rounded to a predefined position of 75°; a measured angular position of 106° is round to a predefined position of 105°, and so on.

In case the measured position of the display lid correlates to at least one of the predefined positions 306, 308, for instance 105°, a memory may provide the pre-stored optimal parameter-set for the antenna tuning 312 that be tune the antennas for data sending and receiving over the radio frequency channels 314, e.g. using open-loop antenna tuning.

In case the measured position of the display lid does not correlate to at least one of the predefined positions 306, 310, e.g. not within a predefined threshold range, e.g. within 15°, to the next predefined angular position, an interpolation algorithm may derive the antenna tuning parameters corresponding to the measured position of the display lid. In the exemplary embodiment, a segmented-liner interpolation using two neighbor anchor points determines the antenna tuning parameters.

Figure 4:
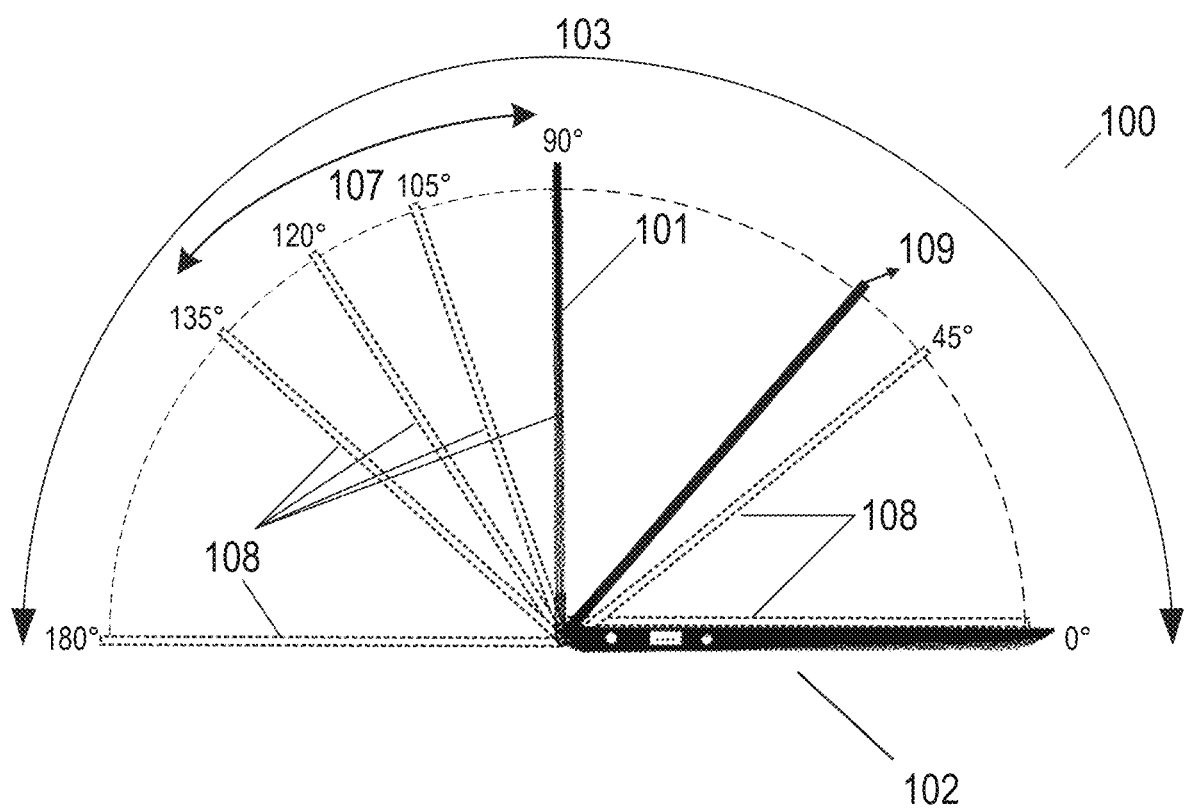
FIG. 4 illustrates a schematic diagram of a mobile communication device.

In the example illustrated in in FIG. 4, the display panel 101 is positioned in an angle 109 of 55° relative to the chassis 102 of the mobile communication device 100. Following the example described before, the next predefined position would be located at 60° (multiple of) 15°. However, antenna parameters may not be predetermined for this angle, and hence, an angle of 60° may not be one of the predefined position 108—only as an illustrative example and not intended as limitation. The method may use the predefined positions 108 next to the actual position of the display panel 101, e.g. predefined positions 108 at 90° and 45°, for a linear interpolation to determine the antenna tuning parameters corresponding to 55°.

Figure 5:
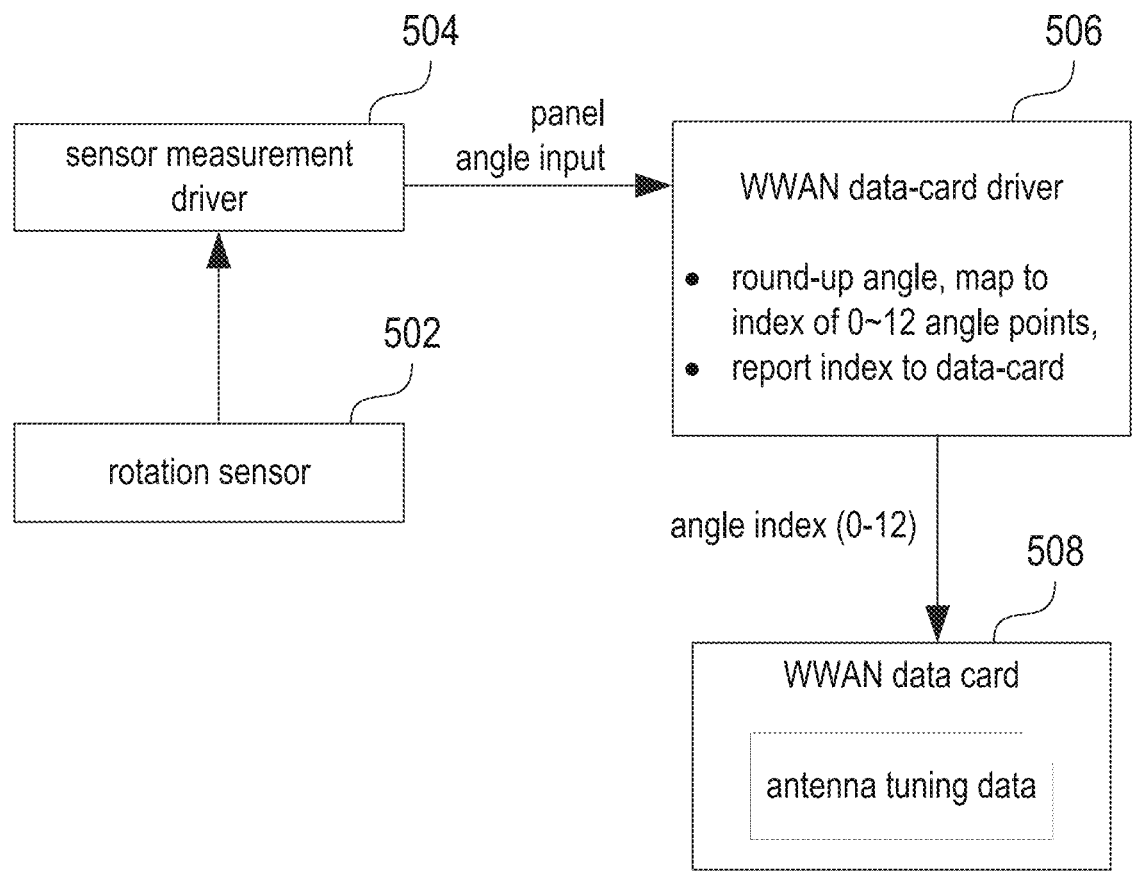
FIG. 5 and FIG. 6 illustrate flow diagrams of methods to operate a mobile communication device.
Figure 6:
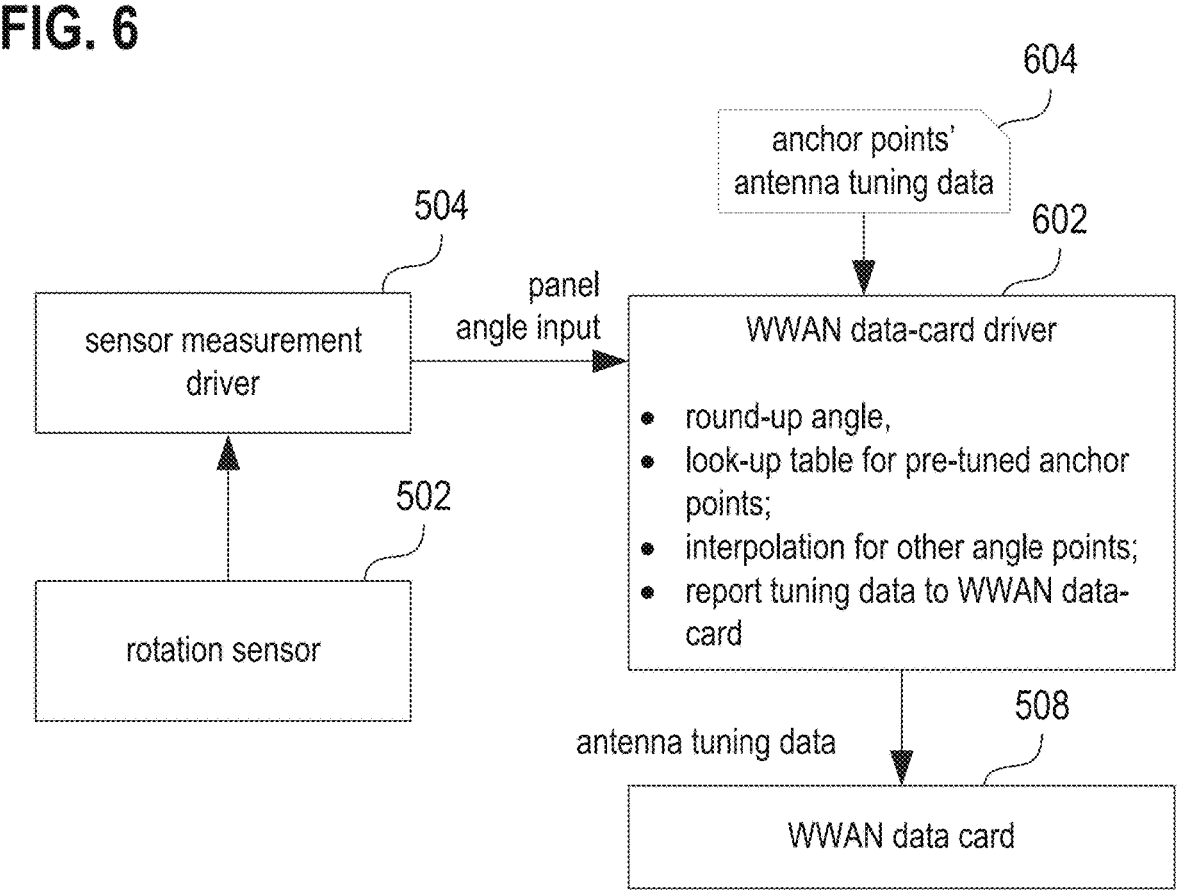

The interpolation may be an end-user stage run-time algorithm. Alternatively, or in addition, the antenna tuning parameters are determined using interpolation at in-Lab stage, as shown in FIG. 5 and FIG. 6 respectively. FIG. 5 and FIG. 6 illustrate flow diagrams of methods to operate a mobile communication device.

A rotation sensor 502 may provide a measured angle of the display panel relative to the chassis to a sensor measurement driver 504. The sensor measurement driver 504 may provide data correlated to the determined position as panel angle input to a controller, e.g. a WWAN data-card driver 506. The controller may determine a predefined position that correlates to the actual determined position, e.g. by rounding up the angle and mapping the round-up angle to one of the plurality of predefined positions. The controller provides the determined predefined position, e.g. via an index number of the predefined position of the plurality of predefined positions, to the wireless communication unit having one or more antennas, e.g. the WWAN data card 508. The WWAN data card 508 retrieves the antenna tuning parameter associated to the determined predefined position, and drives the antenna(s) accordingly.

In an exemplary embodiment, shown in FIG. 5, in-Lab stage may obtain the antenna tuning parameters for a total of 13 angular points, with 15° interval, covering a rotation range from 0° to 180°. Among them, 7 anchor points may be obtained from manual tuning and the rest 6 points may be derived from interpolation. The total 13 sets of antenna tuning parameters are then pre-flashed into WWAN data-card's NAND device, as an example. A WWAN data-card host driver/service interfaces to angle sensor driver to track the latest display panel rotation angle and maps it to an index of 0 to 12, representing the 13-sets of antenna tuning parameters. Then the index may be sent to the WWAN data-card which uses it to select the corresponding dataset stored in its NAND storage.

In another exemplary embodiment, as shown in FIG. 6, the manually tuned anchor points datasets may be stored at a personal computer (PC) host side 604, and a run-time interpolation based on the display panel rotation angle is also made at PC host side, by the data-card driver 602. Then, the obtained antenna tuning parameters may be passed to the WWAN data-card 508, as shown in FIG. 6.

In other words, as illustrated throughout FIG. 1A to FIG. 6, the mobile communication device 100 may include a first component 101 and a second component 102. The first component 101 and the second component 102 may be configured movable relative to each other within a predefined position range 103. The predefined position range 103 may include a plurality of positions of the first component 101 relative to the second component 102, and the mobile communication device 100 may be operational in each of the plurality of positions. The mobile communication device 100 may be a laptop computer, as an example.

At least one of the first component 101 and the second component 102 may include an input unit and/or output unit of the mobile communication device 100. The first component 101 may include a display panel as an output unit and the second component 102 may include a keypad or touch screen as input unit, as an example. As another example, the first component 101 may include a touch screen as an input unit and output unit, and the second component 102 may include a keyboard as an input unit. The first component 101 and/or the second component may have one or more antennas 105.

The first component 101 and the second component 102 may be rotatable attached to each other. As an example, the first component 101 and the second component 102 may be coupled to a hinge. Thus, the movement of the first component 101 relative to the second component 102 may be a rotation. The relative position between the first component 101 and the second component 102 corresponds to an angle between the first component 101 and the second component 102.

At least one of the first component 101 and the second component 102 may include an antenna 105 configured for wireless communication. The antenna 105 may be of a fixed size and/or form factor.

The first component 101 may include a metal frame 112 (e.g. see FIG. 1C) and the second component 102 may include the antenna 105. The antenna 105 may be configured for communications having frequency larger than 1 GHZ, e.g. for 4G or 5G communication, for example. The antenna 105 may be arranged in the proximity of the hinge.

The mobile communication device 100 may further include a position determination unit configured to determine a position of the first component 101 relative to the second component 102 in the predefined position range 103. The position determination unit may include or be a rotation sensor 502, or any other suitable kind of sensor or sensor arrangement configured to determine the relative position and/or distance between the first component 101 and second component 102. As an example, the position determination unit include or more mechanical sensor(s), acceleration sensor(s), proximity sensor(s) and/or near field communication links. The position determination unit may be arranged in at least one of the first component 101, the second component 102, or between the first component 101 and the second component 102, e.g. in a hinge coupling the first component 101 and the second component 102.

The mobile communication device 100 may further include a controller configured to drive the antenna 105 based on the determined position of the first component 101 relative to the second component 102. The controller may be or include the sensor measurement driver 504, WWAN data-card driver 506, 602, an external host 604, and or the WWAN data card 508.

The mobile communication device 100 may further include a memory having instructions stored therein that when executed by the controller cause the controller to determine the position of the first component 101 relative to the second component 102; to determine at least one predefined position 108 correlated to the determined position from a plurality of predefined positions, wherein each of the predefined positions 108 may be correlated to an antenna tuning parameter set; and to control the antenna 105 based on the antenna tuning parameter set correlated to the at least one determined predefined position.

The predefined position range 103 may include a sub-range 107. The sub-range 107 may include a first number density of predefined positions and the predefined position range 103 other than the sub-range 107 may include a second number density of predefined positions lower than the first number density.

Each of the predefined positions 108 may include a threshold range configured to select the predefined position as the determined predefined position in case the determined position may be within the threshold range of the predefined position. In the examples described above, the threshold range is the round up range.

The predefined position range 103 may include a sub-range 107 wherein the threshold ranges of adjacent predefined positions may be contiguous to each other in the sub-range 107.

The predefined position range 103 may include a sub-range 107 wherein the threshold ranges of adjacent predefined positions may be non-contiguous to each other in the predefined position range 103 other than the sub-range 107.

The predefined position of the first component 101 relative to the second component 102 may be determined based on at least a first predefined position and a second predefined position.

The antenna tuning parameter set may be determined based on the antenna tuning parameter sets correlated to at least a first predefined position and a second predefined position.

The antenna tuning parameter sets may be stored in a look up table for each of the plurality of predefined positions.

Alternatively, the mobile communication device 100 may include a controller and a memory having instructions stored therein that when executed by the controller cause the controller to: determine a position of a first component 101 relative to a second component 102 of the mobile communication device. The first component 101 and the second component 102 may be configured movable relative to each other within a predefined position range 103, the predefined position range 103 may include a plurality of positions of the first component 101 relative to the second component 102, and wherein at least one of the first component 101 and the second component 102 may include an antenna 105 configured for wireless communication; determine at least one predefined position correlated to the determined position from a plurality of predefined positions, wherein each of the predefined positions may be correlated to an antenna tuning parameter set; and control the antenna 105 based on the antenna tuning parameter set correlated to the at least one determined predefined position.

The first component 101 may include a metal frame and the second component 102 may include the antenna 105.

The predefined position range 103 may include a sub-range 107 wherein the sub-range 107 include a first number density of predefined positions and wherein the predefined position range 103 other than the sub-range 107 may include a second number density of predefined positions lower than the first number density.

Each of the predefined positions may include a threshold range configured to select the predefined position as the determined predefined position in case the determined position may be within the threshold range of the predefined position.

The predefined position range 103 may include a sub-range 107 wherein the threshold ranges of adjacent predefined positions may be non-contiguous to each other in the predefined position range 103 other than the sub-range 107.

The antenna tuning parameter set may be determined based on the antenna tuning parameter sets correlated to at least a first predefined position and a second predefined position.

Figure 7:
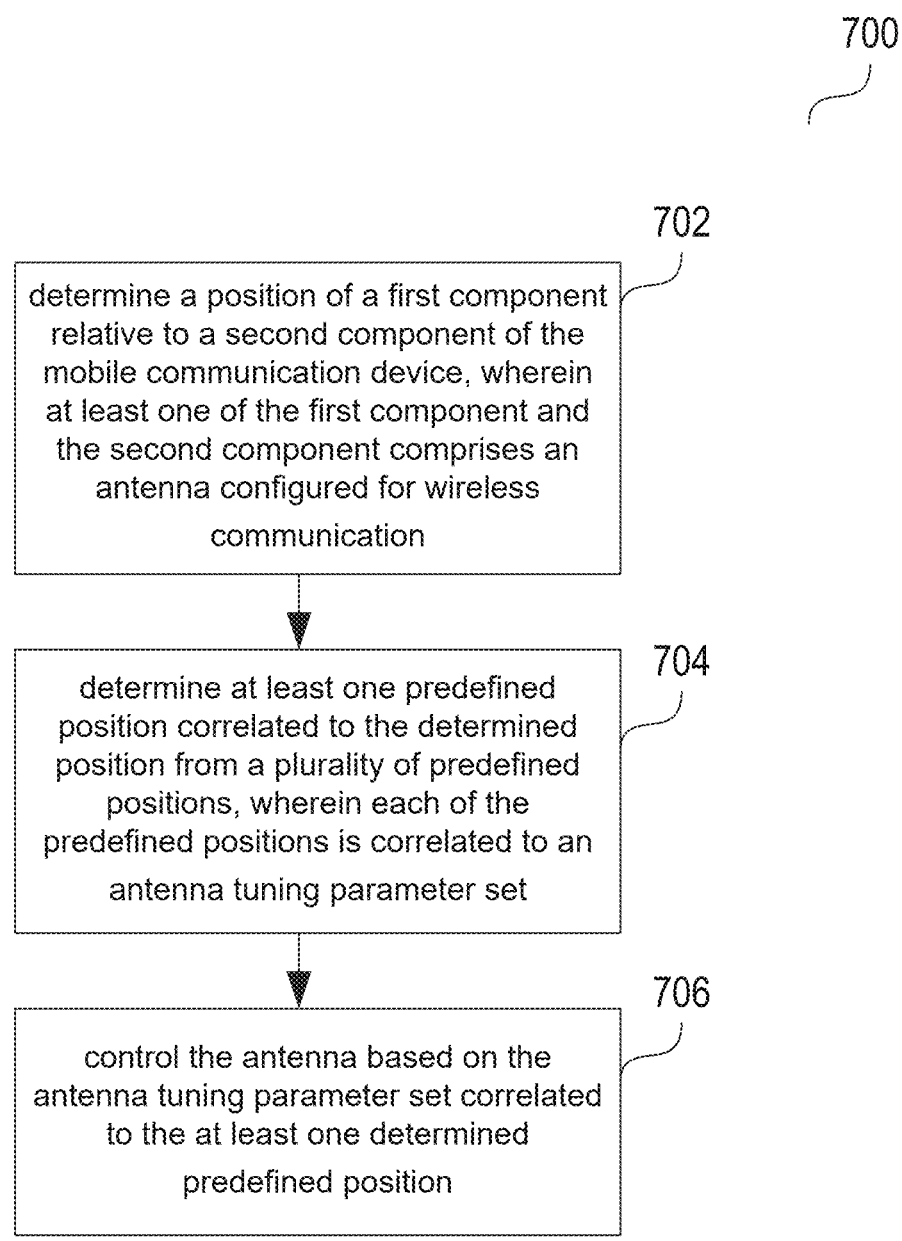
FIG. 7 illustrates a flow diagram of a method to operate a mobile communication device.

FIG. 7 illustrates a flow diagram of a method to operate a mobile communication device. The method 700 to operate a mobile communication device may include determining 702 a position of a first component relative to a second component of the mobile communication device, wherein the first component and the second component may be configured movable relative to each other within a predefined position range, the predefined position range may include a plurality of positions of the first component relative to the second component, and wherein at least one of the first component and the second component may include an antenna configured for wireless communication; determining 704 at least one predefined position correlated to the determined position from a plurality of predefined positions, wherein each of the predefined positions may be correlated to an antenna tuning parameter set; and controlling 706 the antenna based on the antenna tuning parameter set correlated to the at least one determined predefined position. The predefined position range may include a sub-range wherein the sub-range include a first number density of predefined positions and wherein the predefined position range other than the sub-range may include a second number density of predefined positions lower than the first number density. Each of the predefined positions may include a threshold range configured to select the predefined position as the determined predefined position in case the determined position may be within the threshold range of the predefined position. The predefined position range may include a sub-range wherein the threshold ranges of adjacent predefined positions may be non-contiguous to each other in the predefined position range other than the sub-range. The antenna tuning parameter set may be determined based on the antenna tuning parameter sets correlated to at least a first predefined position and a second predefined position.

EXAMPLES

The examples set forth herein are illustrative and not exhaustive.

Example 1 may be a mobile communication device that includes a first component and a second component, wherein the first component and the second component may be configured movable relative to each other within a predefined position range, the predefined position range may include a plurality of positions of the first component relative to the second component; and a position determination unit configured to determine a position of the first component relative to the second component in the predefined position range; wherein at least one of the first component and the second component may include an antenna configured for wireless communication; and a controller configured to drive the antenna based on the determined position of the first component relative to the second component.

In Example 2, the subject matter of Example 1 can optionally include that at least one of the first component and the second component may include an input unit and/or output unit of the mobile communication device.

In Example 3, the subject matter of Example 1 or 2 can optionally include that the first component may include a display panel and the second component may include a keypad or touch screen.

In Example 4, the subject matter of any one of the Examples 1 to 3 can optionally include that the first component may include a metal frame and the second component may include the antenna.

In Example 5, the subject matter of any one of the Examples 1 to 4 can optionally include that the antenna may be of a fixed size and/or form factor.

In Example 6, the subject matter of any one of the Examples 1 to 5 can optionally include that the predefined position range may include a sub-range. The sub-range may include a first number density of predefined positions and wherein the predefined position range other than the sub-range may include a second number density of predefined positions lower than the first number density.

In Example 7, the subject matter of any one of the Examples 1 to 6 can optionally include that the first component and the second component may be rotatable attached to each other, wherein the movement of the first component relative to the second component may be a rotation, wherein the relative position between the first component and the second component corresponds to an angle between the first component and the second component, and wherein the position determination unit may include a rotation sensor.

In Example 8, the subject matter of any one of the Examples 1 to 7 can optionally include that the first component and the second component may be coupled to a hinge.

In Example 9, the subject matter of Example 8 can optionally include that the antenna may be arranged in the proximity of the hinge.

In Example 10, the subject matter of any one of the Examples 1 to 9 can optionally include that the mobile communication device may be operational in each of the plurality of positions.

In Example 11, the subject matter of any one of the Examples 1 to 10 can optionally include a memory having instructions stored therein that when executed by the controller cause the controller to determine the position of the first component relative to the second component; determine at least one predefined position correlated to the determined position from a plurality of predefined positions, wherein each of the predefined positions may be correlated to an antenna tuning parameter set; and control the antenna based on the antenna tuning parameter set correlated to the at least one determined predefined position.

In Example 12, the subject matter of any one of the Examples 1 to 11 can optionally include that each of the predefined positions may include a threshold range configured to select the predefined position as the determined predefined position in case the determined position may be within the threshold range of the predefined position.

In Example 13, the subject matter of any one of the Examples 1 to 14 can optionally include that the predefined position range may include a sub-range wherein the threshold ranges of adjacent predefined positions may be contiguous to each other in the sub-range.

In Example 14, the subject matter of Example 13 can optionally include that the predefined position range may include a sub-range wherein the threshold ranges of adjacent predefined positions may be non-contiguous to each other in the predefined position range other than the sub-range.

In Example 15, the subject matter of any one of the Examples 1 to 14 can optionally include that the predefined position of the first component relative to the second component may be determined based on at least a first predefined position and a second predefined position.

In Example 16, the subject matter of any one of the Examples 11 to 15 can optionally include that the antenna tuning parameter set may be determined based on the antenna tuning parameter sets correlated to at least a first predefined position and a second predefined position.

In Example 17, the subject matter of any one of the Examples 11 to 16 can optionally include that the antenna tuning parameter sets may be stored in a look up table for each of the plurality of predefined positions.

In Example 18, the subject matter of any one of the Examples 1 to 19 can optionally include that the mobile communication device may be a laptop computer.

In Example 19, the subject matter of any one of the Examples 1 to 18 can optionally include that the antenna may be configured for communications having frequency larger than 1 GHz.

Example 20 may be a mobile communication device that may include a controller and a memory having instructions stored therein that when executed by the controller cause the controller to: determine a position of a first component relative to a second component of the mobile communication device, wherein the first component and the second component may be configured movable relative to each other within a predefined position range, the predefined position range may include a plurality of positions of the first component relative to the second component, and wherein at least one of the first component and the second component may include an antenna configured for wireless communication; determine at least one predefined position correlated to the determined position from a plurality of predefined positions, wherein each of the predefined positions may be correlated to an antenna tuning parameter set; and control the antenna based on the antenna tuning parameter set correlated to the at least one determined predefined position.

In Example 21, the subject matter of Example 20 can optionally include that the first component may include a metal frame and the second component may include the antenna.

In Example 22, the subject matter of any one of the Examples 20 to 21 can optionally include that the predefined position range may include a sub-range wherein the sub-range include a first number density of predefined positions and wherein the predefined position range other than the sub-range may include a second number density of predefined positions lower than the first number density.

In Example 23, the subject matter of any one of the Examples 20 to 22 can optionally include that each of the predefined positions may include a threshold range configured to select the predefined position as the determined predefined position in case the determined position may be within the threshold range of the predefined position.

In Example 24, the subject matter of any one of the Examples 20 to 23 can optionally include that the predefined position range may include a sub-range wherein the threshold ranges of adjacent predefined positions may be non-contiguous to each other in the predefined position range other than the sub-range.

In Example 25, the subject matter of any one of the Examples 20 to 24 can optionally include that the antenna tuning parameter set may be determined based on the antenna tuning parameter sets correlated to at least a first predefined position and a second predefined position.

Example 26 is a non-transitory computer readable medium may include instructions which, if executed by one or more processors, cause the one or more processors to: determine a position of a first component relative to a second component of the mobile communication device, wherein the first component and the second component may be configured movable relative to each other within a predefined position range, the predefined position range may include a plurality of positions of the first component relative to the second component, and wherein at least one of the first component and the second component may include an antenna configured for wireless communication; determine at least one predefined position correlated to the determined position from a plurality of predefined positions, wherein each of the predefined positions may be correlated to an antenna tuning parameter set; and control the antenna based on the antenna tuning parameter set correlated to the at least one determined predefined position.

In Example 27, the subject matter of Example 26 can optionally include that the first component may include a metal frame and the second component may include the antenna.

In Example 28, the subject matter of Example 26 or 27 can optionally include that the predefined position range may include a sub-range wherein the sub-range include a first number density of predefined positions and wherein the predefined position range other than the sub-range may include a second number density of predefined positions lower than the first number density.

In Example 29, the subject matter of any one of Examples 26 to 28 can optionally include that each of the predefined positions may include a threshold range configured to select the predefined position as the determined predefined position in case the determined position may be within the threshold range of the predefined position.

In Example 30, the subject matter of any one of Examples 26 to 29 can optionally include that the predefined position range may include a sub-range wherein the threshold ranges of adjacent predefined positions may be non-contiguous to each other in the predefined position range other than the sub-range.

In Example 31, the subject matter of any one of Examples 26 to 30 can optionally include that the antenna tuning parameter set may be determined based on the antenna tuning parameter sets correlated to at least a first predefined position and a second predefined position.

Example 32 is a method to operate a mobile communication device, the method including determining a position of a first component relative to a second component of the mobile communication device, wherein the first component and the second component may be configured movable relative to each other within a predefined position range, the predefined position range may include a plurality of positions of the first component relative to the second component, and wherein at least one of the first component and the second component may include an antenna configured for wireless communication; determining at least one predefined position correlated to the determined position from a plurality of predefined positions, wherein each of the predefined positions may be correlated to an antenna tuning parameter set; and controlling the antenna based on the antenna tuning parameter set correlated to the at least one determined predefined position.

In Example 33, the subject matter of Example 32 can optionally include that the first component may include a metal frame and the second component may include the antenna.

In Example 34, the subject matter of Example 32 or 33 can optionally include that the predefined position range may include a sub-range wherein the sub-range include a first number density of predefined positions and wherein the predefined position range other than the sub-range may include a second number density of predefined positions lower than the first number density.

In Example 35, the subject matter of any one of Examples 32 to 34 can optionally include that each of the predefined positions may include a threshold range configured to select the predefined position as the determined predefined position in case the determined position may be within the threshold range of the predefined position.

In Example 36, the subject matter of any one of Examples 32 to 35 can optionally include that the predefined position range may include a sub-range wherein the threshold ranges of adjacent predefined positions may be non-contiguous to each other in the predefined position range other than the sub-range.

In Example 37, the subject matter of any one of Examples 32 to 36 can optionally include that the antenna tuning parameter set may be determined based on the antenna tuning parameter sets correlated to at least a first predefined position and a second predefined position.

The word "exemplary" is used herein to mean "serving as an example, instance, or illustration." Any example or design described herein as "exemplary" is not necessarily to be construed as preferred or advantageous over other examples or designs.

The words "plurality" and "multiple" in the description or the claims expressly refer to a quantity greater than one. The terms "group (of)", "set [of]", "collection (of)", "series (of)", "sequence (of)", "grouping (of)", etc., and the like in the description or in the claims refer to a quantity equal to or greater than one, i.e. one or more. Any term expressed in plural form that does not expressly state "plurality" or "multiple" likewise refers to a quantity equal to or greater than one.

The terms "processor" or "controller" as, for example, used herein may be understood as any kind of technological entity that allows handling of data. The data may be handled according to one or more specific functions that the processor or controller execute. Further, a processor or controller as used herein may be understood as any kind of circuit, e.g., any kind of analog or digital circuit. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

The term "connected" can be understood in the sense of a (e.g. mechanical and/or electrical), e.g. direct or indirect, connection and/or interaction. For example, several elements can be connected together mechanically such that they are physically retained (e.g., a plug connected to a socket) and electrically such that they have an electrically conductive path (e.g., signal paths exist along a communicative chain).

While the above descriptions and connected figures may depict electronic device components as separate elements, skilled persons will appreciate the various possibilities to combine or integrate discrete elements into a single element. Such may include combining two or more components from a single component, mounting two or more components onto a common chassis to form an integrated component, executing discrete software components on a common processor core, etc. Conversely, skilled persons will recognize the possibility to separate a single element into two or more discrete elements, such as splitting a single component into two or more separate component, separating a chip or chassis into discrete elements originally provided thereon, separating a software component into two or more sections and executing each on a separate processor core, etc. Also, it is appreciated that particular implementations of hardware and/or software components are merely illustrative, and other combinations of hardware and/or software that perform the methods described herein are within the scope of the disclosure.

It is appreciated that implementations of methods detailed herein are exemplary in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

While the disclosure has been particularly shown and described with reference to specific embodiments, it should be understood by those skilled in the art that various changes in form and detail may be made therein without departing from the spirit and scope of the disclosure as defined by the appended claims. The scope of the disclosure is thus indicated by the appended claims and all changes which come within the meaning and range of equivalency of the claims are therefore intended to be embraced.

What is claimed is:

1. A mobile communication device, comprising:
a first component and a second component, wherein the first component and the second component are configured movable relative to each other within a predefined position range, the predefined position range comprising a plurality of positions of the first component relative to the second component, wherein the predefined position range comprises a sub-range wherein the sub-range comprises a first number density of predefined positions and wherein the predefined position range other than the sub-range comprises a second number density of predefined positions lower than the first number density; and
a position determination unit configured to determine a position of the first component relative to the second component in the predefined position range;
wherein at least one of the first component or the second component comprises an antenna configured for wireless communication;
wherein a plurality of tuning parameter sets is distributed across the predefined position range, each tuning parameter set of the plurality of tuning parameter sets corresponding to a different position within the predefined position range; and
a controller configured to drive the antenna based on a tuning parameter set of the plurality of tuning parameter sets, wherein the tuning parameter set corresponds to the determined position of the first component relative to the second component.

2. The mobile communication device of claim 1, wherein at least one of the first component and the second component comprises an input unit and/or output unit of the mobile communication device.

3. The mobile communication device of claim 1, wherein the first component comprises a display panel and the second component comprises a keypad or touch screen.

4. The mobile communication device of claim 1, wherein the first component comprises a metal frame and the second component comprises the antenna.

5. The mobile communication device of claim 1, wherein the antenna is of a fixed size and/or form factor.

6. The mobile communication device of claim 1, wherein the first component and the second component are rotatable attached to each other, wherein the movement of the first component relative to the second component is a rotation, wherein the relative position between the first component and the second component corresponds to an angle between the first component and the second component, and wherein the position determination unit comprises a rotation sensor.

7. The mobile communication device of claim 1, wherein the first component and the second component are coupled to a hinge.

8. The mobile communication device of claim 7, wherein the antenna is arranged in the proximity of the hinge.

9. The mobile communication device of claim 1, wherein the mobile communication device is operational in each of the plurality of positions.

10. The mobile communication device of claim 1, further comprising a memory having instructions stored therein that when executed by the controller cause the controller to:
determine the position of the first component relative to the second component;
determine at least one predefined position correlated to the determined position form a plurality of predefined positions, wherein each of the predefined positions is correlated to an antenna tuning parameter set; and control the antenna based on the antenna tuning parameter set correlated to the at least one determined predefined position.

11. The mobile communication device of claim 1, wherein each of the predefined positions comprises a threshold range configured to select the predefined position as the determined predefined position in case the determined position is within the threshold range of the predefined position.

12. The mobile communication device of claim 1, wherein the predefined position range comprises a sub-range wherein the threshold ranges of adjacent predefined positions are contiguous to each other in the sub-range.

13. The mobile communication device of claim 1, wherein the predefined position range comprises a sub-range wherein the threshold ranges of adjacent predefined positions are non-contiguous to each other in the predefined position range other than the sub-range.

14. The mobile communication device of claim 1, wherein the predefined position of the first component relative to the second component is determined based on at least a first predefined position and a second predefined position.

15. The mobile communication device of claim 1, wherein the antenna tuning parameter set is determined based on the antenna tuning parameter sets correlated to at least a first predefined position and a second predefined position.

16. The mobile communication device of claim 1, wherein the antenna tuning parameter sets are stored in a look up table for each of the plurality of predefined positions.

17. The mobile communication device of claim 1, wherein the mobile communication device is a laptop computer.

18. The mobile communication device of claim 1, wherein the antenna is configured for communications having frequency larger than 1 GHz.

19. A non-transitory computer readable medium, comprising instructions which, if executed by one or more processors, cause the one or more processors to:
determine a position of a first component relative to a second component of the mobile communication device, wherein the first component and the second component are configured to be movable relative to each other within a predefined position range, the predefined position range comprising a plurality of positions of the first component relative to the second component, wherein the predefined position range comprises a sub-range wherein the sub-range comprises a first number density of predefined positions and wherein the predefined position range other than the sub-range comprises a second number density of predefined positions lower than the first number density, and wherein at least one of the first component and the second component comprises an antenna configured for wireless communication;
determine at least one predefined position correlated to the determined position from a plurality of predefined positions, wherein each of the predefined positions is correlated to an antenna tuning parameter set and thus form a plurality of antenna tuning parameter sets;
wherein the plurality of antenna tuning parameter sets is distributed across the predefined position range, each antenna tuning parameter set of the plurality of antenna tuning parameter sets corresponding to a different position within the predefined position range; and
control the antenna based on the antenna tuning parameter set correlated to the at least one determined predefined position.

20. The non-transitory computer readable medium of claim 19, wherein the first component comprises a metal frame and the second component comprises the antenna.

21. The non-transitory computer readable medium of claim 19, wherein each of the predefined positions comprises a threshold range configured to select the predefined position as the determined predefined position in case the determined position is within the threshold range of the predefined position.

22. The non-transitory computer readable medium of claim 19, wherein the predefined position range comprises a sub-range wherein the threshold ranges of adjacent predefined positions are non-contiguous to each other in the predefined position range other than the sub-range.

23. The non-transitory computer readable medium of claim 19, wherein the antenna tuning parameter set is determined based on the antenna tuning parameter sets correlated to at least a first predefined position and a second predefined position.

24. A mobile communication device, comprising:
a first component and a second component, wherein the first component and the second component are configured movable relative to each other within a predefined position range, the predefined position range comprising a plurality of positions of the first component relative to the second component; and
a position determination unit configured to determine a position of the first component relative to the second component in the predefined position range;
wherein at least one of the first component or the second component comprises an antenna configured for wireless communication;
wherein a plurality of tuning parameter sets is distributed across the predefined position range, each tuning parameter set of the plurality of tuning parameter sets corresponding to a different position within the predefined position range; and
a controller configured to drive the antenna based on a tuning parameter set of the plurality of tuning parameter sets, wherein the tuning parameter set corresponds to the determined position of the first component relative to the second component, wherein each of the predefined positions comprises a threshold range configured to select the predefined position as the determined predefined position in case the determined position is within the threshold range of the predefined position.

* * * * *